(12) United States Patent
Heukelbach et al.

(10) Patent No.: US 8,652,646 B2
(45) Date of Patent: Feb. 18, 2014

(54) FILM HAVING A PHOTOCATALYTIC ACTIVE SURFACE

(75) Inventors: Dirk Heukelbach, Weiterstadt (DE); Klaus Thinnes, Osthofen (DE)

(73) Assignee: Renolit AG, Worms (DE)

( * ) Notice: Subject to any disclaimer, the term of this patent is extended or adjusted under 35 U.S.C. 154(b) by 585 days.

(21) Appl. No.: 12/674,158

(22) PCT Filed: Aug. 14, 2008

(86) PCT No.: PCT/EP2008/006682
§ 371 (c)(1), (2), (4) Date: Feb. 7, 2011

(87) PCT Pub. No.: WO2009/024285
PCT Pub. Date: Feb. 26, 2009

(65) Prior Publication Data
US 2011/0123814 A1 May 26, 2011

(30) Foreign Application Priority Data

Aug. 22, 2007 (DE) .......................... 10 2007 039 590

(51) Int. Cl.
*B32B 21/04* (2006.01)
*B32B 27/08* (2006.01)
*B32B 13/12* (2006.01)
*B32B 9/04* (2006.01)
*B32B 27/00* (2006.01)
*B29C 65/00* (2006.01)

(52) U.S. Cl.
USPC ........ 428/500; 428/411.1; 428/451; 428/461; 428/515; 428/537.1; 156/60

(58) Field of Classification Search
None
See application file for complete search history.

(56) References Cited

U.S. PATENT DOCUMENTS

| 7,641,940 B1 * | 1/2010 | Linkous ......................... 427/322 |
| 7,897,252 B1 * | 3/2011 | Linkous ......................... 428/323 |
| 2002/0160910 A1 * | 10/2002 | Sanbayashi et al. .......... 502/208 |
| 2009/0275464 A1 * | 11/2009 | Horiuchi et al. .............. 502/159 |

FOREIGN PATENT DOCUMENTS

| EP | 0 343 491 A | 11/1989 |
| JP | 2007-313705 A | 12/2007 |

* cited by examiner

*Primary Examiner* — Sheeba Ahmed
(74) *Attorney, Agent, or Firm* — Paul D. Strain, Esq.; Strain & Strain PLLC

(57) ABSTRACT

The instant invention relates to a weatherproof film comprising a substrate layer, a barrier layer and a surface layer based on polymethacrylate, wherein, according to the invention, the surface layer contains 0.1 to 15 weight % of a photocatalyst, based on the total weight of the layer, as well as to the use thereof as laminate film, tarp or the like.

19 Claims, No Drawings

FILM HAVING A PHOTOCATALYTIC ACTIVE SURFACE

The instant invention relates to films comprising a photocatalytically active surface and to the use thereof.

Films have been used extensively for many years in outdoor areas as well. On the one hand, films as such are used, e.g. as tarps, awnings, swimming pool films or blinds, on the other hand, they are used as coating of profiles or panels for windows, doors, shutters, folding shutters, facade elements and other components.

The first windows made of hard polyvinyl chloride (PVC) profiles were launched almost 50 years ago. PVC profiles have large advantages in view of the easy producibility by means of extrusion, low costs and good usage properties. The percentage of PVC windows in Germany is more than 50%, while it is slightly lower in Europe.

It is known to apply a dyed or patterned surface film onto the surface of objects, such as, e.g., window profiles, doors, racks, housings of plastic, wood, derived timber products, metals or similar materials, so as to thus, on the one hand, protect the surface of the objects from harmful impacts, for example a discoloration caused by light and other weather impacts or from mechanical impacts and, on the other hand, to design the surface to be more appealing. The impression of valuable wood can be generated by laminating the surface with a patterned film, for example, even when using a base material, which would actually not be suitable due to its characteristic, structure, surface or color.

Such surface films must fulfill the most varying demands. For example, they provide mechanical protection, protection against impacts by agents of all types, e.g. water and moisture, in the case of outdoor uses, protection against weather and light.

In recent years, an additional tempering of the surface has been attained in other areas, such as glass or ceramics, in that it was possible to provide the surface with a self-cleaning effect, also called lotus effect, by means of a fine structuring. According to the surface found in the case of lotus plants, structures are hereby applied, which in cooperation with the surface tension prevent a wetting of the surface with water. The surface is thus cleaned from all particles resting thereon in response to rain or rinsing with water and it always seems be clean or seems to be clean at least much longer.

With reference to glass, ceramics, but also house paint or stucco, this principle is quite effective. However, attempts of transferring onto the laminate films for windows have failed. The surface structures at the plastic are already destroyed after a short-term wear in practice.

A further attempt to create self-cleaning surfaces is based on the use of photocatalysis, by means of which the surface contaminations e.g. in the case of tiles or components of concrete, are eliminated or at least lightened by means of chemical reaction, which is initiated by sunlight and a suitable catalyst. The most common catalyst is titanium dioxide.

This attempt also fails in the case of the common laminate films made of polyvinyl chloride (PVC), acrylonitrile-butadiene-styrene copolymers (ABS) and similar common materials, because they are depolymerized by means of the photochemical impact and thereby e.g. become yellow, brittle or tear. In the case of the widespread use of titanium dioxide as pigment in plastic, a coating with silicum and aluminum compounds is carried out, so as to prevent the impact on the plastic in the case of outdoor uses.

The demands on films, which are to be suitable for the lamination of window profiles and other parts, which are subject to weathering, are high. In particular climatic conditions, such as strong heating in sunlight, UV radiation, as well as temperature and humidity changes are a strain on the films. However, they must retain a flawless appearance for decades, must be capable of being reliably connected to the profiles consisting of PVC or of wood, metal or other plastics, such as polyolefins and ABS and must permanently withstand mechanical stresses, e.g., they must be scratch proof.

The object is to equip such films with a self-cleaning surface.

Surprisingly, it was now found that it is possible to provide multi-layer films comprising a photocatalytically active surface layer when the photocatalyst is introduced into a film or film layer, respectively, on the basis of methacrylate polymers.

The above object is thus solved by means of a film comprising a substrate layer, which can be connected to a profile, a barrier layer and a surface layer, based on a polymethacrylate, wherein the surface layer contains 0.1 to 15 weight % of a photocatalyst, based on the total weight of the layer.

With reference to the composition of films or film layers, respectively, the term "based on" signifies within the scope of the instant invention that said film or film layer, respectively, substantially consists of said polymer or said polymer mixture, wherein common additives, fillers, etc. can be added in the respectively known quantities and in a subordinate percentage of up to 50 weight %, normally not more than 20 weight % and in particular not more than 10 weight % of other polymers. Specifically, no other polymers are contained (aside from production-related contaminations, e.g.).

Unless otherwise specified, the term polymer comprises homopolymers and copolymers as well as mixtures of two or more polymers. As a rule, polymers encompass a molecular weight of at least 10,000, typically of several 10,000 up to several 100,000 g/mol. In the case of copolymers, they can be e.g. statistical, alternating, block copolymers as well as graft copolymers.

Within the context of the instant invention, the term "film" refers to a 2-dimensional structure, the width and length of which exceeds the thickness severalfold. As a rule, the thickness is less than one millimeter up to a few micrometers.

Unless specifically indicated, a film can be single-layered or multi-layered, e.g. two-layered, three-layered or four-layered. The individual layers can be joined by means of calendering, extrusion, coextrusion, extrusion coating and/or by means of different laminating methods, such as adhesion, thermo-bonding and the like. In the case of lamination, the connection is carried out across the entire area or substantially across the entire area.

Within the context of the instant invention, the term "profile" refers to a constructive component, such as, e.g., a window profile, doorframe, fence element, railing, housing, wall element, furniture etc. Preferably, the profiles are based on PVC, but can also be based on other plastics or can consist of wood, metal or two or more of said materials. Aluminum and/or PVC, for example, is a typical material in the case of window profiles.

The film according to the invention is to be capable of being laminated onto such profiles according to inherently common methods. This determines the demands on the mechanical film characteristics and also determines the possible materials for the lowermost layer of the film, which is to be connected to the profile.

The film according to the invention encompasses at least three layers, a first layer which can be connected to the profile and which is referred to as substrate layer, an uppermost layer which forms the outer surface of the film, and an intermediate layer, which is referred to as barrier layer. Further layers can be added, wherein either the function of a layer is taken over by two layers or the additional layer(s) has/have its/their own functions.

Furthermore, it became apparent that the films according to the invention can also advantageously be used as a tarp, e.g. Truck tarps, awnings, tarpaulins and many tarps more for outdoor uses can thus be equipped with a self-cleaning function. In this case, the substrate layer takes over the supporting characteristics, that is, it ensures that the mechanical demands are fulfilled. In the alternative, provision can also be made for an additional support layer.

In the case of laminate films, the substrate layer is chosen according to the invention such that it can be connected to the profile in the common laminating methods. Naturally different polymers are suitable for this purpose, depending on the material of the profile. In the case of plastic profiles, the substrate layer contains the same plastic as the profile in a preferred embodiment.

Substrate layers, which are based on PVC, acrylates, styrene polymers, acrylonitrile-styrene-acrylate terpolymers, acrylonitrile-butadiene-styrene terpolymers or polyolefins are particularly suitable for profiles, which are based on PVC. The substrate layer takes over the decorative functions of the laminate film and, as a rule, is thus pigmented and/or imprinted.

As a rule, the thickness of the substrate layer lies in the range of from 25 to 1000 μm, preferably from 60 to 1000 μm. In addition to the pigments, the substrate layer can also contain common additives, fillers, etc.

Substrate layers on the basis of PVC comprising a k-value in the range of from 60 to 90 or also mixtures of such polyvinyl chlorides, for example, are well suited. Typically, 65 to 100 parts of PVC are mixed with 35 to 0 parts of plasticizer and 1 to 5 parts of stabilizer and/or 0.1 to 1.5 parts of lubricant are added to 100 parts of this mixture. 1.0 to 15 parts by weight of pigment or pigment mixture are added for the pigmentation. A typical composition is:

| | |
|---|---|
| PVC (e.g. k-value 65) | 65 to 100 parts |
| Plasticizer (e.g. phthalate) | 35 to 0 parts |
| Stabilizer (e.g. Ba/Zn, Ca/Zn, Sn) | 2 parts |
| Lubricant (e.g. fatty acid derivative) | 0.7 parts |
| Pigments | 1 to 15 parts |

Substrate layers on the basis of acrylate, for example of a blend of polymethyl methacrylate and polybutyl acrylate, are also well suited. 1 part of antioxidants and/or 1 part of lubricants as well as 1 to 15 parts of pigment or pigment mixture are typically used herein for 100 parts of polymer. A typical composition is:

| | |
|---|---|
| Blend PMMA/PBA | 95 parts |
| PMMA (molecular weight 80,000-200,000 g/mol) | 5 parts |
| Antioxidants | 1 part |
| Lubricants | 1 part |
| Pigments | 1 to 15 parts |

The barrier layer is preferably based on a polymethacrylate. Polymethyl methacrylate and other polymethacrylates, as well as in particular mixtures of different polymethacrylates and/or methacrylate copolymers, for example, are suitable as polymethacrylate.

Preferably, the barrier layer contains one or more substances, which absorb UV radiation, such as pigmentation with organic UV absorbers, coated fine-particle ZnO, $SiO_2$. Additives, such as, e.g., pigment wetting agents, leveling agents and/or fillers can furthermore be contained. A typical composition is:

| | |
|---|---|
| PMMA (e.g. molecular weight 300,000 g/mol) | 75 parts |
| PMMA (e.g. molecular weight 80,000 g/mol) | 25 parts |
| Antioxidants | 1.5 parts |
| UV absorbers (organic) | 1 part |
| UV absorbers (inorganic) | 3.5 parts |

This barrier layer can be applied as lacquer, for example 25 weight % of PMMA dissolved in a mixture of ethyl acetate/methyl ethyl ketone/butyl acetate.

The thickness of the barrier layer is dimensioned such that the energy emitted by the photocatalyst in the surface layer as well as UV radiation of the sunlight does not reach into the substrate layer located therebelow. Said substrate layer is thus protected effectively and the material thereof can be adapted to the mechanical-technical and decorative requirements. Thicknesses of from 1 to 50 μm have proven themselves.

The surface layer is based on polymethacrylate and contains the photocatalyst. Typically, the thickness lies in the range of from 10 to 50 μm. Common additives, UV absorbers, fillers, etc. can also be contained in addition to the photocatalyst, for example 0.1 to 2.0 weight % of coated or uncoated ZnO and/or 0.1 to 5.0 weight % of $SiO_2$. If desired, pigments and/or dyes can also be contained. A typical composition for the surface layer is:

| | |
|---|---|
| PMMA (molecular weight 300,000 g/mol) | 80 parts |
| PMMA (molecular weight 80,000 g/mol) | 20 parts |
| Photocatalyst (titanium dioxide) | 3.5 parts |
| Antioxidants | 1.5 parts |

This coat can be applied well as lacquer, for example 20 weight % of PMMA dissolved in a mixture of ethyl acetate/methyl ethyl ketone/butyl acetate.

In a further embodiment, the surface layer can be a multi layer construction, e.g. a two layer, wherein an uppermost layer comprising a higher content of photocatalyst and a layer located therebelow comprising a lower content of photocatalysts is present.

In this case, an uppermost layer can consist, e.g. of 100 parts of PMMA comprising a molecular weight of 80,000 g/mol and 10 parts of photocatalyst. Such a layer can be applied well as lacquer, for example 30 weight % of PMMA dissolved in a mixture of ethyl acetate/methyl ethyl ketone/butyl acetate. In such a layer, provision can also be made for a depolymerizing additive, so as to increase the photocatalytic activity by means of a more rapid exposure of catalyst particles.

The photocatalyst is stimulated by solar radiation and then initiates the decomposition of adhering contaminations or the formation of radicals, respectively, of water and atmospheric oxygen, which initiate the decomposition of adhering contaminations.

In particular fine-particle titanium dioxide, that is, titanium dioxide in the rutile or anatase modification with particle sizes in the range of from 1 to 100 nm, preferably 10 nm to 100 nm, is suitable as photocatalyst. It goes without saying that the titanium dioxide may not be provided with a coating, which blocks the photocatalytic activity, in particular it is uncoated titanium dioxide. It is also possible to use mixtures of different photocatalysts.

Possible discolorations caused by the photocatalyst or by other components can be corrected in an inherently known manner, such as by adding pigments.

The substrate and/or barrier layer can also consist of two or more different layers. For example, the barrier layer can consist of two layers, wherein the compositions of the layers are different and the adhesion with the respective adjacent layer is thus optimized.

The laminate films according to the invention are weatherproof, that is, they do not show any substantial changes of the characteristics, even under the influence of UV radiation, high and low temperatures as well as moisture and water. Typically, the films encompass the following characteristics:

| | |
|---|---|
| Thickness (DIN EN ISO 2286-3, ram diameter 10 mm with level surface, pressure 50 kPa, measurement via embossing) | 200 μm |
| Breaking tension (DIN EN ISO 527-3) | >15 MPa, preferably >20 MPa |
| Breaking elongation (DIN EN ISO 527-3) | >10%, preferably >100% |
| Dimensional stability (DIN 53377, 15 Min./100° C.) | change <4%, preferably <2% |
| Weatherproofness (EN 513 - method 1, grey scale according to ISO 105 - A03) | Color change ≤ grey scale 4 in the case of a radiation of 8 GJ/m$^2$ according to requirements RAL GZ 716/1 part 7 |
| Moisture resistance (DIN 50017 KFW) | Color change ≤ grey scale 3 |
| Rubfastness (ISO 105 - X 12) | Note 5 |

The production of the films according to the invention takes place in an inherently known manner. The substrate layer can be produced e.g. by means of calendering or extrusion. The further layers can be applied by means of lacquering, by means of coextrusion, extrusion coating, by means of laminating or embossing. It is possible for two layers to be coextruded and for the third or further layers to be connected by means of embossing, laminating.

In a first preferred alternative, all of the layers are coextruded.

In a further preferred alternative, substrate and barrier layer are coextruded and the surface layer is applied by means of lacquering or extrusion coating.

In a third preferred embodiment, the substrate layer is calendered or extruded and the barrier layer as well as the surface layer are applied by means of lacquering.

It is preferred when the photocatalyst particles are exposed on their surface subsequent to the production of the film. This can take place by means of different inherently known methods of the surface treatment of films, e.g. UV radiation, electron radiation, corona treatment, application of flame, plasma treatment or by means of mechanical, chipping methods for the surface treatment, such as sand blasting, grinding, etc. Due to this treatment, the catalytic effect becomes effective more rapidly, because the exposed particles are available directly at the surface and are thus in contact with the contaminations, which are to be eliminated.

In the case of the embodiment comprising a two-coat surface layer, it is advantageous that such a treatment is not necessary due to the higher content of photocatalyst in the uppermost coat.

After being laminated onto profiles, the films according to the invention result in components comprising a self-cleaning surface. The invention thus also relates to the use of films for producing components comprising a self-cleaning surface, comprising a substrate layer, which can be connected to a profile, a barrier layer and a surface layer based on a polymethacrylate, wherein the surface layer contains 0.1 to 15 weight % of a photocatalyst, based on the total weight of the layer.

This is highly advantageous for components such as windows, fences, etc. in the case of which a cleaning is often arduous and partially also dangerous in the case of windows. The components, which are produced according to the invention, have the characteristic to decompose or lighten contaminations, which adhere due to the incident sunlight, so that a cleaning is necessary much less frequently or is not necessary at all. The known advantages of laminate films, such as scratch resistance, decorative appearance, etc. remain completely.

The laminating process as such is known to the person skilled in the art. Typically, profile and film are continuously supplied to a device, which connects both by means of adhesive. If applicable, the film as well as the profile can be cleaned beforehand, can be subjected to a corona treatment and/or can be heated. For the most part, hot melt adhesives, e.g. reactive polyurethane adhesives are currently used as adhesive. Film and profile are deep-injected after the adhesive application, wherein the laminate is attained. If applicable, this laminate can still be reheated or otherwise aftertreated.

However, as already mentioned, the films according to the invention are also suitable for other purposes.

For example, tarps for trucks, awnings or tents can be made therefrom, e.g. In this case, the substrate layer is not adapted to a laminating process, but to the necessary mechanical characteristics of the tarp, thus resulting in an advantageous tarp, due to the fact that it is self-cleaning.

A further use of the films is for producing swimming pools. In the case of this use, the cleaning effort can be reduced considerably. It is important herein that the substrate layer ensures the watertightness as well as, in turn, the mechanical characteristics.

The following examples are to exemplify the invention in more detail, however, without limiting it to the specifically described embodiments. Unless otherwise specified, all of the % or part designations refer to the weight.

EXAMPLE 1

A film comprising the following three layers was produced:
Substrate Layer:

| | |
|---|---|
| S-PVC | 80 parts |
| Plasticizer | 20 parts |
| Stabilizer Ba/Zn liquid | 2.1 parts |
| Titanium dioxide, rutile type, coated | 12 parts |

The composition is calendered into a film comprising a layer thickness of 80 μm.
Barrier Layer:

| | |
|---|---|
| PMMA (molecular weight 300,000 g/mol) | 15 parts |
| Ethyl acetate | 37 parts |

-continued

| | |
|---|---|
| 2-Butanone | 37 parts |
| Butyl acetate | 11 parts |
| UV absorber organic | 0.6 parts |
| ZnO, nano-type coated | 0.5 parts |
| $SiO_2$ | 0.5 parts |

The layer is applied onto the substrate layer by means of lacquer application as a solution by means of a doctor blade, 30 μm gap width. The layer thickness after the drying is 3-5 μm.

Surface Layer:

| | |
|---|---|
| PMMA (molecular weight 80,000 g/mol) | 25 parts |
| Ethyl acetate | 30 parts |
| 2-Butanone | 30 parts |
| Butyl acetate | 15 parts |
| $TiO_2$ nano-anatase-type | 1.0 parts |
| ZnO nano type uncoated | 0.5 parts |
| $SiO_2$ | 0.5 parts |

The layer is applied onto the barrier layer by means of lacquer application as a solution by means of a doctor blade, 30 μm gap width. The layer thickness after the drying is 5-7 μm.

After the drying of the surface layer, the film was treated at the surface layer with a corona discharge (device by Ahlbrandt System GmbH, Lauterbach, Germany). Three treatment runs took place at a speed of 10 cm/s in each case.

EXAMPLE 2

Analogously to example 1, a film comprising the following four layers was produced.

Substrate Layer: Extruded

| | |
|---|---|
| Blend PMMA/PBA - powder | 90 parts |
| PMMA (molecular weight 80,000 g/mol) | 10 parts |
| Antioxidants | 2.0 parts |
| Lubricants | 0.5 parts |
| Titanium dioxide, rutile type, coated | 10 parts |
| Layer thickness 130 μm | |

Barrier Layer:

| | |
|---|---|
| PMMA (molecular weight 300,000 g/mol) | 15 parts |
| Ethyl acetate | 37 parts |
| 2-Butanone | 37 parts |
| Butyl acetate | 11 parts |
| UV absorber organic | 0.6 parts |
| ZNO, nano type coated | 0.5 parts |
| $SiO_2$ | 0.5 parts |

Lacquer application by means of doctor blade, 15 μm gap width, layer thickness dry 3-5 μm.

Surface Layer Lower Layer:

| | |
|---|---|
| PMMA (molecular weight 300,000 g/mol) | 15 parts |
| Ethyl acetate | 35 parts |
| 2-Butanone | 35 parts |
| Butyl acetate | 15 parts |
| $TiO_2$ nano-anatase-type | 1.0 parts |
| ZnO nano type uncoated | 0.5 parts |
| $SiO_2$ | 0.5 parts |

Lacquer application by means of doctor blade, 30 μm gap width, layer thickness dry 5-7 μm.

Surface Layer Upper Layer:

| | |
|---|---|
| PMMA (molecular weight 80,000 g/mol) | 25 parts |
| Ethyl acetate | 30 parts |
| 2-Butanone | 30 parts |
| Butyl acetate | 15 parts |
| $TiO_2$ nano-anatase-type | 5.0 parts |
| ZnO nano type uncoated | 0.5 parts |
| $SiO_2$ | 0.5 parts |

Lacquer application by means of doctor blade, 30 μm gap width, layer thickness dry 5-7 μm.

After the drying of the surface layer, the film surface was treated with a corona discharge (device by Ahlbrandt System GmbH, Lauterbach, Germany). Three treatment runs took place at a speed of 10 cm/s in each case.

EXAMPLES 3 TO 8

Analogously to example 1, further films were produced comprising the compositions mentioned in the following Table 1:

| FilmNo. | Substrate layer | Barrier layer | Surface layer | Pigment in upper layer | Content $TiO_2$ |
|---|---|---|---|---|---|
| 1 | PVC film, calendered, pigmented white | ./. | ./. | $TiO_2$ rutile coated | 12% |
| 2 | PVC film, calendered, pigmented white | 5 μm PMMA separating layer | 5 μm PMMA lacquer layer | Nano-structured anatase titanium dioxide | 1.0% |
| 3 | PVC film, calendered, pigmented white | 5 μm PMMA separating layer | 5 μm PMMA lacquer layer | Nano-structured anatase titanium dioxide | 2.0% |
| 4 | PVC film, calendered, pigmented white | 5 μm PMMA separating layer | 5 μm PMMA lacquer layer | Nano-structured anatase titanium dioxide | 4.0% |
| 5 | PVC film, calendered, pigmented white | 5 μm PMMA separating layer | 5 μm PMMA lacquer layer | Nano-structured anatase titanium dioxide | 10% |
| 6 | PVC film, calendered, pigmented white | 5 μm PMMA separating layer | 5 μm PMMA lacquer layer | Nano-structured anatase titanium dioxide | 40% |

These films have been subjected to the following tests.

As a measure for general wetting ability, the surface tension was measured indirectly via a wetting angle assessment with different liquids, so-called test inks having different surface tension. These test inks are mixtures of water and alcohol. A wetting angle only forms when the surface tension of the measuring liquid is greater than the surface tension of the solid substrate. In the event that the surface tension of the measuring liquid is the same or less than the surface tension of the substrate, a complete spreading (wetting angle=0°) takes place.

As a measure for wetting ability, especially of water, the wetting angle was measured between the film surface and water in that a water drop—with a known surface tension—is placed onto the film substrate by means of a pipette in the "sessile drop" method and in that the wetting angle is optically determined by means of a goniometer.

As a measure for the weatherproofness and for the self-cleaning, the discoloration of the film was determined by means of colorimetric methods. By means of mathematical formula, the colorimetry attempts to numerically illustrate the visual result of a color observation or of a color comparison. ΔE specifies the perceived distance of two color samples. In so doing, differences between two colors, for example between non-contaminated original film and contaminated film are to be provided with numerical values according to the perception of how severe the difference is. The object is to attain a numerical value for the perception of a difference, so as to be able to communicate the color difference. A ΔE of 1 thereby corresponds to a small, but visible difference. A ΔE of 5 is clearly visible.

a) Outdoor Weathering:

The films to be tested were subjected to weather on a test rack for 45 days. The incline of the rack was 45° in a southward direction, the set-up took place in an area with industrial atmosphere.

b) Simulated Weathering:

The weathering took place in a test apparatus Xenotest 1200, the test duration was 500 h (acceleration: 1000 h correspond to approx. 1 year of outdoor weathering). The following conditions prevailed in the apparatus: radiation: filtered Xenon arc light, filtered air, cycle light/sprinkling with water 108/12 minutes.

The resazurin test was used as measure for the self-cleaning ability with reference to organic contaminations. As a redox indicator, the blue resazurin color indicates chemical reaction and activity, here the redox reaction of the photoactivity by $TiO_2$ by means of irreversible color change to the pink-colored fluorescent resorufin.

The following table combines the results of the analyses.

|  | Film 1 | Film 2 | Film 3 | Film 4 | Film 5 | Film 6 |
| --- | --- | --- | --- | --- | --- | --- |
| Surface tension Test ink [dyn/cm] | 36 | 38 | 38+ | 41− | 41 | 41 |
| Wetting angle [°] | 88 | 73 | 69 | 65 | 72 | 66 |
| Color change ΔE Outdoor weathering | 5 | 0.5 | 0.5 | 0.5 | 0 | 0 |
| Color change ΔE Xenotest | 0 | 0 | 0 | 0 | 0 | 0 |
| Resazurin test | Neg. | Pos. | Pos. | Pos. | Pos. | Pos. |

It can clearly be seen that the film used for the comparison without photocatalytic surface is contaminated to a considerable degree during the outdoor weather. However, the color change is not based on a weathering-related aging, because no color change is observed in the xeno test. The resazurin test confirms these results; while the comparison film does not show any effect, a pink coloration takes place in the case of all concentrations of photocatalyst of the films 2 to 6 according to the invention, that is, the films according to the invention have a photocatalytically active surface. Due to the photocatalytically active surface, a decomposition of adhering contaminations and thus a self-cleaning takes place in response to radiation with sunlight.

The invention claimed is:

1. A weather-resistant film comprising a substrate layer, a barrier layer, and a surface layer, wherein the surface layer comprises at least 50% by weight of polymethacrylate and 0.1 to 15 weight % of a photocatalyst, based on the total weight of the layer.

2. The film according to claim 1, wherein the substrate layer is a layer, which can be connected to a profile made of plastic, wood, metal, or two or more of said materials.

3. The film according to claim 1, wherein the substrate layer is based on polyvinyl chloride, acrylate polymer, styrene polymer, acrylonitrile-styrene-acrylate terpolymer, acrylonitrile-butadiene-styrene terpolymer, polyolefin or mixtures of different polyvinyl chlorides, acrylate polymers, styrene polymers, acrylonitrile-styrene-acrylate terpolymers, acrylonitrile-butadiene-styrene terpolymers, polyolefins, or mixtures of said polymers.

4. The film according to claim 3, wherein the substrate layer consists essentially of 65 to 100 parts by weight of polyvinyl chloride(s) with 0 to 35 parts by weight of plasticizier and per 100 parts by weight of this mixture, 1 to 5 parts by weight of stabilizer and/or 0.1 to 1.5 parts by weight of lubricant as well as 1.0 to 15 parts by weight of pigment or pigment mixture.

5. The film according to claim 3, wherein the substrate layer consists essentially of 100 parts by weight of polymethacrylate or a mixture of polymethacrylates and 1 part by weight of antioxidants and/or 1 part by weight of lubricant as well as 1 to 15 parts by weight of pigment or pigment mixture.

6. The film according to claim 1, wherein the barrier layer is based on a polymethacrylate.

7. The film according to claim 1, wherein the barrier layer comprises one or more UV radiation-absorbing substances and/or other additives.

8. The film according to claim 6, wherein the barrier layer consists essentially of 100 parts by weight of polymethyl methacrylate as well as 1 to 10 parts by weight of UV absorber or UV absorber mixture and, if applicable, of 1-5 parts by weight of additives and/or 1-10 parts by weight of fillers.

9. The film according to claim 1, wherein the surface layer consists essentially of 100 parts by weight of polymethacrylate or mixtures of polymethyl methacrylate with other polymethacrylates and 1 to 10 parts by weight of photocatalyst as well as 0 or 1-5 parts by weight of additives and/or 0 or 1-10 parts by weight of fillers.

10. The film according to claim 1, wherein the surface layer is designed in two layers, wherein the content of photocatalyst in the upper layer is greater than in the lower layer.

11. The film according to claim 10, wherein the content of photocatalyst is 5 to 15 weight % in the upper layer and 0.1 to 10 weight % in the lower layer.

12. A method for manufacturing profiles for windows, doors, and other parts, which are subjected to the weather, comprising the steps of:

providing a film comprising a substrate layer, a barrier layer and a surface layer, wherein the surface layer comprises at least 50% by weight of polymethacrylate and 0.1 to 15 weight % of a photocatalyst, based on the total weight of the layer, providing a profile for windows, door, or other part and laminating the film to the profile for windows, door or other part so that the surface of the window, door, or other part encompasses a photocatalytic activity.

13. An article comprising a film comprising a substrate layer, a barrier layer, and a surface layer, wherein the surface layer comprises at least 50% by weight of polymethacrylate and 0.1 to 15 weight % of a photocatalyst, based on the total weight of the layer, wherein the article is a tarp, awning, sun blind, or swimming pool lining.

14. A window profile comprising plastic, wood and/or metal, further comprising a laminated film, wherein the film comprises a substrate layer, a barrier layer, and a surface layer comprising a polymethacrylate, wherein the surface layer comprises 0.1 to 15 weight % of a photocatalyst, based on the total weight of the layer.

15. The film according to claim 3, wherein the barrier layer is based on a polymethacrylate.

16. The film according to claim 3, wherein the surface layer consists essentially of 100 parts by weight of polymethacrylate or mixtures of polymethyl methacrylate with other polymethacrylates and 1 to 10 parts by weight of photocatalyst as well as 0 or 1-5 parts by weight of additives and/or 0 or 1-10 parts by weight of fillers.

17. The film according to claim 15, wherein the surface layer consists essentially of 100 parts by weight of polymethacrylate or mixtures of polymethyl methacrylate with other polymethacrylates and 1 to 10 parts by weight of photocatalyst as well as 0 or 1-5 parts by weight of additives and/or 0 or 1-10 parts by weight of fillers.

18. The film according to claim 3, wherein the surface layer is designed in two layers, wherein the content of photocatalyst in an upper layer is 5 to 15 weight %, and wherein the content of photocatalyst in a lower layer is 0.1 to 10 weight %.

19. The film according to claim 15, wherein the surface layer is designed in two layers, wherein the content of photocatalyst in an upper layer is 5 to 15 weight %, and wherein the content of photocatalyst in a lower layer is 0.1 to 10 weight %.

* * * * *